(No Model.)
M. REUS.
FRUIT GATHERER.
No. 527,622. Patented Oct. 16, 1894.
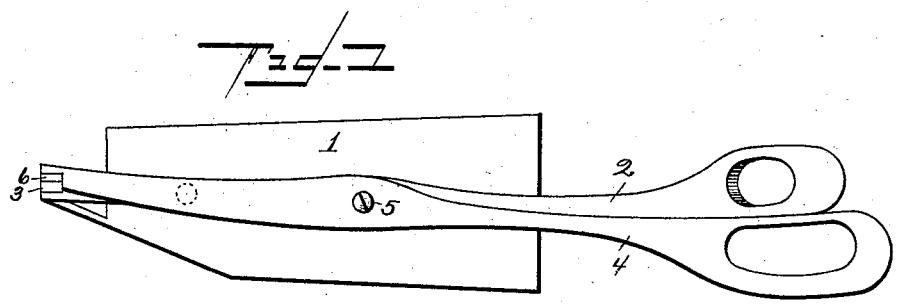
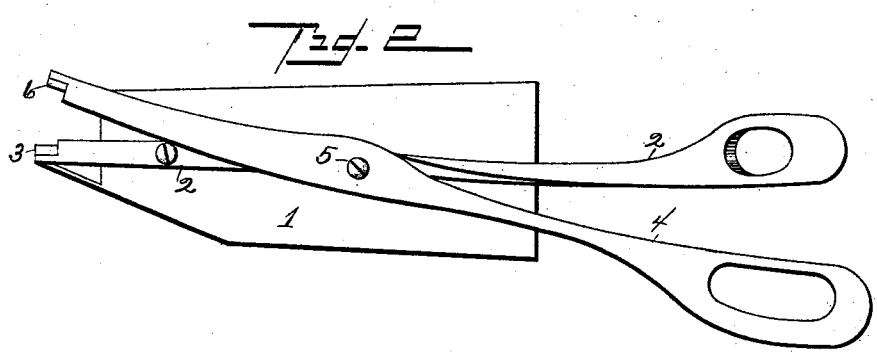
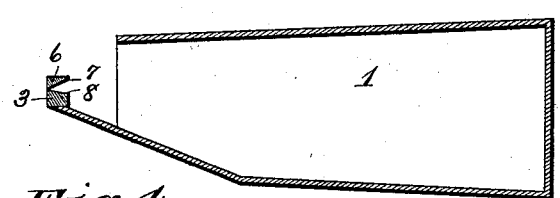
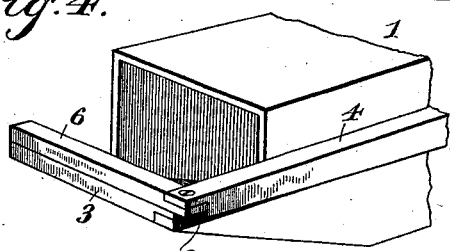
Fig. 4.
Witnesses
Inventor
Michael Reus
Attorney

UNITED STATES PATENT OFFICE.

MICHAEL REUS, OF ESCATAWPA, MISSISSIPPI.

FRUIT-GATHERER.

SPECIFICATION forming part of Letters Patent No. 527,622, dated October 16, 1894.

Application filed December 19, 1893. Serial No. 494,024. (No model.)

*To all whom it may concern:*

Be it known that I, MICHAEL REUS, of Escatawpa, county of Jackson, and State of Mississippi, have invented certain new and useful Improvements in Fruit-Gatherers, of which the following is a specification, reference being had to the accompanying drawings.

The object of my invention is to produce a new kind of fruit gatherer which is adapted to gather fruit growing on a tree without injury to the fruit, and with convenience and expedition.

In the accompanying drawings, Figure 1 is a side elevation of my gatherer, with the shears closed. Fig. 2 is a similar view with the shears open. Fig. 3 is a central vertical longitudinal section through the receptacle. Fig. 4 is a plan view of my device.

Referring to the figures on the drawings, 1 indicates a suitable receptacle, preferably made of light material and somewhat wedge shape in form, and having one of the sides prolonged considerably above the upper end. 2 indicates a handle securely fastened to one side of the receptacle, and at its upper end to a shear blade 3 that is securely fastened to the upper edge of the prolonged side of the receptacle. 4 indicates another handle pivotally secured as at 5 to the handle 2, and forming with it a sort of shear. It carries upon its upper end at right angles to it a shear blade 6. By reason of the incline of the prolonged side of the receptacle the shear blade 3 is directly over the opening in the receptacle, and when the shear blade 6 is pressed against it upon the stem of a fruit, the stem will be severed and the fruit drop directly into the receptacle.

The shear blades 3 and 6 are beveled, one somewhat more than the other, as indicated at 7 and 8 respectively to afford a cutting edge to the blades, which is necessary for certain varieties of fruits. With some fruits, however, a sharp edge is not needed, and the blades may be used to pull the fruit from the tree, the operation however being substantially the same as above described.

What I claim is—

1. The combination with a receptacle having an open end and inclined extending side, of shear handles to one side of the extending side and operating at right angles thereto, cutting blades extending at right angles from one side only of the handles, one of said cutting blades being secured to and braced by the extended side, whereby such twigs as may be necessary to be removed may be cut without danger of their falling into the receptacle, and whereby the gathered fruit may be with certainty deposited into the receptacle by reason of the location of the shears at one side thereof, substantially as specified.

2. The combination with a receptacle having open upper end and an angular side prolonged beyond the open end, of a shear handle secured to the side of the receptacle at right angles to the angular side, a cutting blade extending at right angles from one side of the extremity of the handle and secured to the inclined extension of the angular side and a second handle pivoted upon the first and provided with a blade extending at right angles to its extremity and in operative relation to the first named blade, substantially as specified.

In testimony of all which I have hereunto subscribed my name.

MICHAEL REUS.

Witnesses:
E. B. SMITH,
G. B. W. RYERT,
L. M. HAND.